(12) United States Patent
Malhotra et al.

(10) Patent No.: US 6,187,083 B1
(45) Date of Patent: Feb. 13, 2001

(54) CONDUCTIVE INKS CONTAINING SULFONATE SALTS

(75) Inventors: Shadi L. Malhotra; Raymond W. Wong; Marcel P. Breton, all of Mississauga (CA)

(73) Assignee: Xerox Corporation, Stamford, CT (US)

(*) Notice: Under 35 U.S.C. 154(b), the term of this patent shall be extended for 0 days.

(21) Appl. No.: 09/401,249

(22) Filed: Sep. 23, 1999

(51) Int. Cl.$^7$ .................................................. C09D 11/00
(52) U.S. Cl. ................................ 106/31.29; 106/31.61; 106/31.32; 106/31.64; 106/31.43; 106/31.75; 106/31.92
(58) Field of Search ...................... 106/31.29, 31.32, 106/31.43, 31.49, 31.61, 31.75, 31.78, 31.64, 31.92

(56) References Cited

U.S. PATENT DOCUMENTS

| | | | |
|---|---|---|---|
| 4,745,419 | 5/1988 | Quate et al. ................ | 346/140 R |
| 5,541,627 | 7/1996 | Quate ................................ | 347/10 |
| 5,876,492 | 3/1999 | Malhotra et al. ............... | 106/31.58 |
| 5,902,390 | 5/1999 | Malhotra et al. ............... | 106/31.58 |
| 5,922,117 | 7/1999 | Malhotra et al. ............... | 106/31.58 |
| 5,931,995 | 8/1999 | Malhotra et al. ............... | 106/31.58 |

*Primary Examiner*—Mark L. Bell
*Assistant Examiner*—Veronica F. Faison
(74) *Attorney, Agent, or Firm*—Judith L. Byorick

(57) ABSTRACT

Disclosed is an ink composition comprising (a) an ink vehicle which is selected from (i) 1,3-dialkyl ureas, (ii) N,N'-ethylene bisalkylamides, (iii) N-[4-chloro-3-[4,5-dihydro-5-oxo-1-(2,4,6-trichlorophenyl)-1H-pyrazol-3-ylamino] phenyl]-2-(1-octadecenyl) succinimide, (iv) 1,3-diamino-5,6-bis(octyloxy) isoindoline, (v) N,N-dimethyl alkylamine N-oxides, (vi) alkyl amides, or (vii) mixtures thereof, said ink vehicle having a melting point of no lower than about 60° C. and no higher than about 155° C., (b) a viscosity modifier which is an amide having a melting point of no lower than about 60° C. and no higher than about 155° C., (c) a conductive sultonate salt having a melting point of no lower than about 60° C. and no higher than about 155° C., (d) a colorant, (e) an optional antioxidant, and (f) an optional ultraviolet absorber.

20 Claims, No Drawings

CONDUCTIVE INKS CONTAINING SULFONATE SALTS

BACKGROUND OF THE INVENTION

The present invention is directed to hot melt ink compositions. More specifically, the present invention is directed to ink compositions suitable for use in hot melt acoustic ink printing processes, particularly those in which conductive inks are desirable. One embodiment of the present invention is directed to an ink composition comprising (a) an ink vehicle which is selected from (i) 1,3-dialkyl ureas, (ii) N,N'-ethylene bisalkylamides, (iii) N-[4-chloro-3-[4,5-dihydro-5-oxo-1-(2,4,6-trichlorophenyl)-1H-pyrazol-3-ylamino] phenyl]-2-(1-octadecenyl) succinimide, (iv) 1,3-diamino-5,6-bis(octyloxy) isoindoline, (v) N,N-dimethyl alkylamine N-oxides, (vi) alkyl amides, or (vii) mixtures thereof, said ink vehicle having a melting point of no lower than about 60° C. and no higher than about 155° C., (b) a viscosity modifier which is an amide having a melting point of no lower than about 60° C. and no higher than about 155° C., (c) a conductive sulfonate salt having a melting point of no lower than about 60° C. and no higher than about 155° C., (d) a colorant, (e) an optional antioxidant, and (f) an optional ultraviolet absorber.

Acoustic ink jet printing processes are known. In acoustic ink jet printing processes, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," IBM Technical Disclosure Bulletin, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appi. Phys., vol. 65, no. 9 (May 1, 1989) and references therein, the disclosure of which is totally incorporated herein by reference.

In acoustic ink printing processes, the printhead produces approximately 2.2 picoliter droplets by an acoustic energy process. The ink under these conditions preferably displays a melt viscosity of from about 1 to about 25 centipoise at the jetting temperature. In addition, once the ink has been jetted onto the printing substrate, the image thus generated preferably exhibits excellent crease properties, and is nonsmearing, waterfast, of excellent transparency, and of excellent fix. The vehicle preferably displays a low melt viscosity in the acoustic head while also displaying solid like properties after being jetted onto the substrate. Since the acoustic head can tolerate temperatures typically up to about 180° C., the vehicle for the ink preferably displays liquid-like properties (such as a viscosity of from about 1 to about 25 centipoise) at a temperature of from about 75 to about 180° C., and solidifies or hardens after being jetted onto the substrate such that the resulting image exhibits a hardness value of from about 0.1 to about 0.5 millimeter (measured with a penetrometer according to the ASTM penetration method D1321).

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing solid inks for printing on a substrate such as paper. The ink vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In thermal ink jet printing processes employing these phase-change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase-change ink is applied to the substrate, freezing on the substrate resolidifies the ink.

In phase-change printing processes, the ink preferably undergoes a change with temperature from a solid state to a liquid state in a desirably short period of time, typically in less than about 100 milliseconds. One advantage of phase-change inks is their ability to print superior images on plain paper, since the phase-change ink quickly solidifies as it cools, and, since it is primarily waxy in nature, it does not normally soak into a paper medium.

Phase-change inks also preferably exhibit a high degree of transparency, generally measured in terms of haze value of the ink. Transparent, low haze inks exhibit high gloss and high optical density compared to opaque inks, although both may appear to be evenly colored.

The use of phase-change inks in acoustic ink printing processes is also known. U.S. Pat. No. 4,745,419 (Quate et al.), the disclosure of which is totally incorporated herein by reference, discloses acoustic ink printers of the type having a printhead including one or more acoustic droplet ejectors for supplying focused acoustic beams. The printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

U.S. Pat. No. 5,541,627 (Quate), the disclosure of which is totally incorporated herein by reference, discloses a method and apparatus for ejecting droplets from the crests of capillary waves riding on the free surface of a liquid by parametrically pumping the capillary waves with electric fields from probes located near the crests. Crest stabilizers are beneficially used to fix the spatial locations of the capillary wave crests near the probes. The probes are beneficially switchably connected to an AC voltage supply having an output that is synchronized with the crest motion. When the AC voltage is applied to the probes, the resulting electric field adds sufficient energy to the system so that the surface tension of the liquid is overcome and a droplet is ejected. The AC voltage is synchronized such that the droplet is ejected about when the electric field is near is minimum value. A plurality of droplet ejectors are arranged and the AC voltage is switchably applied so that ejected droplets form a predetermined image on a recording surface. The capillary waves can be generated on the free surface of the liquid by using acoustical energy at a level approaching the onset of droplet ejection. The liquid used with the invention must also must be attracted by an electric field.

Phase-change inks used in acoustic ink printing processes also preferably exhibit a low acoustic-loss value, typically below about 100 decibels per millimeter. In addition, the ink vehicle preferably can fill the pores of a porous substrate, such as paper, and preferably has a melting point of from about 80 to about 120° C.; this melting point, along with low acoustic-loss, enables a minimization of energy consumption. When the phase-change inks are used in an electric field assisted acoustic ink printing process, the inks also are sufficiently conductive to permit the transmission of electrical signals generated by the electric field assisted acoustic ink jet printer; the inks preferably exhibit a conductivity of from about 2 to about 9 log(picomho/cm) (measured under melt conditions at about 150° C. by placing an aluminum electrode in the molten ink and reading the resistivity output on a GenRad 1689 precision RLC Digibridge at a frequency of 1 kilohertz). In general, the conductivity of a material can be measured in terms of the reciprocal of resistivity, which is the capacity for electrical resistance. Further information regarding electric field assisted acoustic ink printing processes is disclosed in, for example, Copending Application U.S. Ser. No. 09/280,717, filed Mar. 30, 1999, entitled "Method and Apparatus for Moving Ink Drops using an Electric Field and Transfuse Printing System Using the Same," with the named inventors John S. Berkes, Vittorio R. Castelli, Scott A. Elrod, Gregory J. Kovacs, Meng H. Lean, Donald L. Smith, Richard G. Stearns, and Joy Roy, the disclosure of which is totally incorporated herein by reference, which discloses a method of forming and moving ink drops across a gap between a printhead and a print medium or intermediate print medium in a marking device. The method includes generating an electric field, forming the ink drops adjacent to the printhead, and controlling the electric field. The electric field is generated to extend across the gap. The ink drops are formed in an area adjacent to the printhead. The electric field is controlled such that an electrical attraction force exerted on the formed ink drops by the electric field is the greatest force acting on the ink drops. The marking device can be incorporated into a transfuse printing system having an intermediate print medium made of one or more materials that allow for lateral dissipation of electrical charge from the incident ink drops.

U.S. Pat. No. 5,876,492 (Malhotra et al.), the disclosure of which is totally incorporated herein by reference, discloses an ink comprising (1) a liquid ester vehicle, (2) a solid ester compound, (3) a liquid crystalline ester compound, (4) a UV absorber, (5) an antioxidant, and (6) a colorant.

U.S. Pat. No. 5,922,117 (Malhotra et al.), the disclosure of which is totally incorporated herein by reference, discloses an ink composition comprising (1) a liquid alcohol vehicle, (2) a solid alcohol compound, (3) a quaternary compound, (4) a lightfastness UV absorber, (5) a lightfastness antioxidant, and (6) a colorant.

U.S. Pat. No. 5,902,390 (Malhotra et al.), the disclosure of which is totally incorporated herein by reference, discloses an ink comprising (1) a liquid ketone, (2) a solid ketone, (3) a lightfastness UV absorber, (4) a lightfastness antioxidant, and (5) a colorant.

U.S. Pat. No. 5,931,995 (Malhotra et al.), the disclosure of which is totally incorporated herein by reference, discloses an ink comprising (1) a liquid aidehyde, a liquid acid, or mixtures thereof, (2) a solid additive aldehyde compound, a solid additive acid compound, or mixtures thereof, (3) a lightfastness UV absorber, (4) a lightfastness antioxidant, and (5) a colorant.

U.S. Pat. No. 5,958,119, entitled "Hot Melt Ink Compositions," filed Sep. 23, 1997, with the named inventors Shadi L. Malhotra and Danielle C. Boils, the disclosure of which is totally incorporated herein by reference, discloses an ink composition comprising (1) a liquid cyclic vehicle, (2) a cyclic compound, (3) a liquid crystalline nitrile compound, (4) a lightfastness UV absorber, (5) a lightfastness antioxidant, and (6) a colorant.

U.S. Pat. No. 6,045,607, entitled "Ink Compositions," filed Mar. 30, 1999, with the named inventors Marcel P. Breton, Shadi L. Malhotra, and Raymond W. Wong, the disclosure of which is totally incorporated herein by reference, discloses an ink composition containing (1) a first solid carbamate, (2) a second carbamate with a dissimilar melting point from the first solid carbamate (1), (3) a lightfastness component, (4) a lightfastness antioxidant, and (5) a colorant.

U.S. Pat. No. 6,123,499, entitled "Inks," filed Jul. 29, 1999, with the named inventors Raymond W. Wong, Marcel P. Breton, Danielle C. Boils, Fatima M. Mayer, and Shadi L. Malhotra, the disclosure of which is totally incorporated herein by reference, discloses an ink composition comprising (1) a carbamate or thiourea with a melting point of from about 60° C. to about 120° C. and an acoustic-loss value of from about 25 to about 80 decibels per millimeter, (2) an alcohol compound with a melting point of about 25° C. to about 90° C. and with an acoustic-loss value of from about 5 to about 40 decibels per millimeter, (3) a lightfastness component, (4) an antioxidant, and (5) a colorant.

U.S. Pat. No. 6,110,265, entitled "Ink Compositions," filed Apr. 27, 1999, with the named inventors Marcel P. Breton, Shadi L. Malhotra, Raymond W. Wong, Danielle C. Boils, Carl P. Tripp, and Pudupadi R. Sundararajan, the disclosure of which is totally incorporated herein by reference, discloses an ink composition comprising (1) a solid oxazoline compound with a melting point of from about 60° C. to about 120° C. and an acoustic-loss value of from about 25 to about 80 decibels per millimeter; (2) a carbamate compound with a melting point of from about 25° C. to about 100° C.; (3) an alcohol compound; (4) a lightfastness component; (5) a lightfastness antioxidant; and (6) a colorant.

U.S. Pat. No. 6,096,124, entitled "Ink Compositions," filed Apr. 27, 1999, with the named inventors Raymond W. Wong, Shadi L. Malhotra, and Marcel P. Breton, the disclosure of which is totally incorporated herein by reference, discloses a conductive ink composition comprising (1) an acid salt; (2) a conductive quaternary compound; (3) a viscosity modifying compound; (4) a lightfastness component; (5) a lightfastness antioxidant; and (6) a colorant.

U.S. Pat. No. 6,071,333, entitled "Ink Compositions," filed Apr. 27, 1999, with the named inventors Marcel P. Breton, Shadi L. Malhotra, and Raymond W. Wong, the disclosure of which is totally incorporated herein by reference, discloses an ink composition containing (1) a solid carbamate compound; (2) an alcohol compound with a melting point of from about 25° C. to about 90° C.; (3) a lightfastness component; (4) a lightfastness antioxidant; and (5) a colorant.

U.S. Pat. No. 6,086,661, entitled "Ink Compositions," filed Apr. 27, 1999, with the named inventors Shadi L. Malhotra, James D. Mayo, and Marcel P. Breton, the disclosure of which is totally incorporated herein by reference, discloses an aqueous ink composition comprising (1) a quaternary compound selected from the group consisting of (a) imidazolinium quaternary salts, (b) phosphonium quaternary salts, and (c) ammonium quaternary salts; (2) a liquid ink vehicle; (3) a paper-curl reducing compound; (4) a lightfastness component; (5) a lightfastness antioxidant; (6) a substantially water soluble organic salt or a substantially water soluble inorganic salt; (7) a biocide; and (8) a colorant.

U.S. Pat. No. 6,096,125, entitled "Ink Compositions," filed Apr. 27, 1999, with the named inventors Marcel P. Breton, Shadi L. Malhotra, Danielle C. Boils, Raymond W. Wong, Guerino G. Sacripante, and John M. Lennon, the disclosure of which is totally incorporated herein by reference, discloses an ink composition comprising (1) a mixture of a salt and an oxyalkylene compound wherein the conductive mixture possesses a melting point of from about 60° C. to about 120° C.; (2) an ink vehicle compound with a melting point of from about 80° C. to about 100° C.; (3) a viscosity modifying amide compound; (4) a lightfastness component; (5) a lightfastness antioxidant; and (6) a colorant.

U.S. Pat. No. 6,106,599, entitled "Inks," filed Jun. 29, 1999, with the named inventors Marcel P. Breton, Shadi L. Malhotra, and Raymond W. Wong, the disclosure of which is totally incorporated herein by reference, discloses an ink composition comprising (1) an azole compound, (2) a viscosity compound, (3) a lightfastness component, (4) an antioxidant, and (5) a colorant.

Copending Application U.S. Ser. No. 09/342,947, entitled "Ink Compositions," filed Jun. 29, 1999, with the named inventors Marcel P. Breton, Shadi L. Malhotra, and Gregory J. Kovacs, the disclosure of which is totally incorporated herein by reference, discloses an ink composition comprising (1) a polymer; (2) an acid compound of the formula $CH_3(CH_2)_m(CH_2CH=CH)_p(CH_2)_nCOOH$ wherein n, m, and p represent the number of segments; (3) a conductive component; (4) a lightfastness component; and (5) a colorant.

Copending Application U.S. Ser. No. 09/281,682, entitled "Ink Compositions," filed Mar. 30, 1999, with the named inventors H. Bruce Goodbrand, Danielle C. Boils, Pudupadi R. Sundararajan, Raymond W. Wong, and Shadi L. Malhotra, the disclosure of which is totally incorporated herein by reference, discloses an ink composition comprising (1) a thiourea with a melting point of from about 60 to about 120° C. and with an acoustic-loss value of from about 25 to about 80 decibels per millimeter, (2) an optional ink carbamate with a melting point of from about 25° C. to about 60° C. and with an acoustic-loss value of from about 5 to about 40 decibels per millimeter, (3) a lightfastness component, (4) a lightfast antioxidant, and (5) a colorant.

U.S. Pat. No. 6,066,200, entitled "Ink Compositions," filed Apr. 27, 1999, with the named inventors Marcel P. Breton, Shadi L. Malhotra, and Raymond W. Wong, the disclosure of which is totally incorporated herein by reference, discloses an ink composition comprising (1) a solid urea compound; (2) an alcohol; (3) a lightfastness component; (4) a lightfast antioxidant; and (5) a colorant.

U.S. Pat. No. 6,106,601, entitled "Ink Compositions," filed Apr. 27, 1999, with the named inventors Shadi L. Malhotra, Raymond W. Wong, and Marcel P. Breton, the disclosure of which is totally incorporated herein by reference, discloses an ink composition comprising (1) an oxazoline compound; (2) a thiourea compound with an optional melting point of from about 25 to about 100° C. and with an optional acoustic-loss value of from about 5 to about 40 decibels per millimeter; (3) an alcohol; (4) a lightfastness compound; (5) an antioxidant; and (6) a colorant.

Copending Application U.S. Ser. No. 09/404,569, entitled "Conductive Inks Containing Pyridine Compounds," filed concurrently herewith, with the named inventors Shadi L. Malhotra, Raymond W. Wong, and Marcel P. Breton, the disclosure of which is totally incorporated herein by reference, discloses an ink composition comprising (a) an ink vehicle which comprises a conductive pyridinium compound having a melting point of no lower than about 60° C. and no higher than about 155° C., (b) a viscosity modifier which is a pyridine compound, a pyrimidine compound, a pyrazine compound, a pyridazine compound, or mixtures thereof, said pyridine, pyrimidine, pyrazine, or pyridazine compounds having a melting point of no lower than about 60° C. and no higher than about 155° C., (c) a binder which is a polymeric pyridine or pyridinium compound; (d) a colorant, (e) an optional antioxidant, and (f) an optional UV absorber.

U.S. Pat. No. 6,113,678, entitled "Hot Melt Inks Containing Polyanhydrides," filed concurrently herewith, with the named inventor Shadi L. Malhotra, the disclosure of which is totally incorporated herein by reference, discloses an ink composition comprising (a) a polyanhydride ink vehicle, (b) a nonpolymeric anhydride viscosity modifier, and (c) a colorant.

Copending Application U.S. Ser. No. 09/404,570, entitled "Hot Melt Inks Containing Aldehyde Copolymers," filed concurrently herewith, with the named inventor Shadi L. Malhotra, the disclosure of which is totally incorporated herein by reference, discloses an ink composition comprising (a) an aldehyde copolymer ink vehicle, (b) a nonpolymeric aldehyde viscosity modifier, (c) a colorant, (d) an optional conductivity enhancing agent, (e) an optional antioxidant, and (f) an optional UV absorber.

Copending Application U.S. Ser. No. 09/401,740, entitled "Hot Melt Inks Containing Styrene or Terpene Polymers," filed concurrently herewith, with the named inventor Shadi L. Malhotra, the disclosure of which is totally incorporated herein by reference, discloses an ink composition comprising (a) a styrene polymer or terpene polymer hardening component, (b) a nonpolymeric aromatic viscosity modifier, (c) a colorant, (d) an optional nonpolymeric aromatic ink vehicle, (e) an optional colorant dispersing agent, (f) an optional conductivity enhancing agent, (g) an optional antioxidant, and (h) an optional UV absorber.

U.S. Pat. No. 6,117,223, entitled "Hot Melt Inks Containing Polyketones," filed concurrently herewith, with the named inventor Shadi L. Malhotra, the disclosure of which is totally incorporated herein by reference, discloses an ink composition comprising (a) a nonpolymeric ketone ink vehicle having a melting point of at least about 60° C., (b) a polyketone hardening component, (c) a colorant, (d) a conductivity enhancing agent, (e) an optional antioxidant, (f) an optional viscosity modifier which is a nonpolymeric carbonate, monoketone, or diketone, and (g) an optional ultraviolet absorber.

Copending Application U.S. Ser. No. 09/401,250, entitled "Hot Melt Inks Containing Polyesters," filed concurrently herewith, with the named inventor Shadi L. Malhotra, the disclosure of which is totally incorporated herein by reference, discloses an ink composition comprising (a) a polyester ink vehicle, (b) a nonpolymeric ester viscosity modifier, (c) a colorant, (d) an optional colorant dispersing agent, (e) an optional conductivity enhancing agent, (f) an optional antioxidant, and (g) an optional UV absorber.

While known compositions and processes are suitable for their intended purposes, a need remains for improved phase-change inks. In addition, a need remains for improved inks for acoustic ink printing. Further, a need remains for conductive inks. Additionally, a need remains for phase-change inks with desirable melting point values. There is also a need for phase-change inks with melt viscosities at jetting temperatures that enable high quality ink jet printing. In addition, there is a need for phase-change inks that generate images with excellent hardness values. Further, there is a need for phase-change inks undergo, upon heating, a change from a solid state to a liquid state in a desirably rapid period of time. Additionally, there is a need for phase-change inks with acoustic-loss values that are desirable for acoustic ink printing applications. A need also remains for phase-change ink compositions with conductivity values that are desirable for electric field assisted acoustic ink printing processes. In addition, a need remains for phase-change inks that generate images with desirably low haze values. Further, a need remains for phase-change inks that generate images with good crease resistance. Additionally, a need remains for phase-change inks that generate images with high gloss.

SUMMARY OF THE INVENTION

The present invention is directed to an ink composition comprising (a) an ink vehicle which is selected from (i) 1,3-dialkyl ureas, (ii) N,N'-ethylene bisalkylamides, (iii) N-[4-chloro-3-[4,5-dihydro-5-oxo-1-(2,4,6-trichlorophenyl)-1H-pyrazol-3-ylaminol phenyl]-2-(1-octadecenyl) succinimide, (iv) 1,3-diamino-5,6-bis (octyloxy) isoindoline, (v) N,N-dimethyl alkylamine N-oxides, (vi) alkyl amides, or (vii) mixtures thereof, said ink vehicle having a melting point of no lower than about 60° C. and no higher than about 155° C., (b) a viscosity modifier which is an amide having a melting point of no lower than about 60° C. and no higher than about 155° C., (c) a conductive sulfonate salt having a melting point of no lower than about 60° C. and no higher than about 155° C., (d) a colorant, (e) an optional antioxidant, and (f) an optional ultraviolet absorber.

DETAILED DESCRIPTION OF THE INVENTION

The ink compositions of the present invention contain an ink vehicle. This ink vehicle is selected from (i) 1,3-dialkyl ureas, including those of the general formula $CH_3(CH_2)_n NHCONH(CH_2)_n CH_3$, wherein n is an integer typically of from about 5 to about 20, such as 1,3-dioctadecyl urea (Aldrich 32,803-0), wherein n is 17, and the like, (ii) N,N'-ethylene bisalkylamides, wherein the alkyl groups can be saturated or unsaturated, including those of the general formula (I) [CH$_3$(CH$_2$)$_n$CH=CH(CH$_2$)$_n$CONHCH$_2$—]$_2$, wherein n is an integer typically of from about 5 to about 20, such as N,N'-ethylene bisoleamide (Aldrich 43,466-3), wherein n is 7, and those of the general formula (II) [CH$_3$(CH$_2$)$_n$CHCONHCH$_2$—]$_2$, wherein n is an integer typically of from about 5 to about 20, such as N,N'-ethylene bisstearamide, wherein n is 16, and the like, (iii) N-[4-chloro-3-[4,5-dihydro-5-oxo-1-(2,4,6-trichlorophenyl)-1H-pyrazol-3-ylamino] phenyl]-2-(1-octadecenyl) succinimide (Aldrich 38,582-4), (iv) 1,3-diamino-5,6-bis(octyloxy) isoindoline (Aldrich 46,218-7), (v) N,N-dimethyl alkylamine N-oxides, including those of the general formula CH$_3$(CH$_2$)$_n$N(CH$_3$)$_2$O, wherein n is an integer typically of from about 5 to about 20, such as N,N-dimethyl heptylamine N-oxide hydrate (Aldrich 38,250-7), wherein n is 6, N,N-dimethyl octylamine N-oxide hydrate (Aldrich 36,568-8), wherein n is 7, N,N-dimethyl nonylamine N-oxide hemihydrate (Aldrich 38,252-3), wherein n is 8, N,N-dimethyl undecyl amine N-oxide (Aldrich 38,253-1), wherein n is 10, N,N-dimethyl dodecyl amine N-oxide (Aldrich 28,970-1), wherein n is 11, and the like, (vi) alkyl amides, wherein the alkyl portion can be saturated or unsaturated, including those of the general formula (I) CH$_3$(CH$_2$)$_n$CH=CH(CH$_2$)$_m$CONH$_2$, wherein m and n are each integers the sum of which typically is from about 5 to about 20, such as erucamide (Aldrich 28,057-7), wherein n is 7 and m is 11, and those of the general formula (II) CH$_3$(CH$_2$)$_n$CONH$_2$, wherein n is an integer typically of from 0 to about 20, such as acetamide (Aldrich 12,263-7), wherein n is 0, propionamide (Aldrich 14,393-6), wherein n is 1, hexanoamide (Aldrich 29,339-3), wherein n is 4, octadecanamide (Aldrich O-60-1), wherein n is 16, or the like, or (vii) mixtures thereof. The ink vehicle is present in the ink in any desired or effective amount, typically no less than about 0.5 percent by weight of the ink, preferably no less than about 20 percent by weight of the ink, and more preferably no less than about 25 percent by weight of the ink, and typically no more than about 98 percent by weight of the ink, preferably no more than about 49 percent by weight of the ink, more preferably no more than about 45 percent by weight of the ink, and even more preferably no more than about 40 percent by weight of the ink, although the amount can be outside of these ranges. Preferably, the ink vehicle has a melting point of no less than about 60° C., and preferably has a melting point of no more than about 155° C., and preferably has an acoustic-loss value of no more than about 100 decibels per millimeter, although the melting point and acoustic-loss value can be outside of these ranges. In addition, conductive materials generally are preferred to nonconductive materials, although nonconductive materials can also be employed.

The ink compositions of the present invention also contain a viscosity modifier. The viscosity modifier is an amide. Specific classes of suitable amides include sulfonamides, imides (including succinimides, phthalimides, and the like), anilides, and the like. Specific examples of suitable amide viscosity modifiers include the following: (1) sulfonamides: (a) methane sulfonamide, of the formula CH$_3$SO$_2$NH$_2$ (Aldrich 26,904-3), (b) 3-amino-N-butylbenzene sulfonamide, of the formula H$_2$NC$_6$H$_4$SO$_2$NHCH$_2$CH$_3$ (Aldrich 38,747-9), (c) N-benzylidene benzene sulfonamide, of the formula C$_6$H$_5$SO$_2$N=CHC$_6$H$_5$ (Aldrich 30,110-8), (d) N-methyl-p-toluene sulfonamide, of the formula CH$_3$C$_6$H$_4$SO$_2$NHCH$_3$ (Aldrich 14,860-1), (e) N,N-bis [2-(p-tolylsulfonyloxy)ethyl]-p-toluene sulfonamide, of the formula CH$_3$C$_6$H$_4$SO$_2$N(CH$_2$CH$_2$OSO$_2$C$_6$H$_4$CH$_3$)$_2$ (Aldrich 38,068-7), (f) N-benzyl-N-nitroso-p-toluene sulfonamide, of the formula CH$_3$C$_6$H$_4$SO$_2$N(CH$_2$C$_6$H$_5$)NO (Aldrich 43,560-0), (g) N,N-bis(2-hydroxyethyl)-p-toluene sulfonamide, of the formula CH$_3$C$_6$H$_4$SO$_2$N(CH$_2$CH$_2$OH)$_2$ (Aldrich 12,103-7), (h) N-[bis(methylthio)methylene]-p-toluene sulfonamide, of the formula CH$_3$C$_6$H$_4$SO$_2$N=C (SCH$_3$)$_2$ (Aldrich 42,068-9), (i) N-(tert-butoxycarbonyl)-p-toluene sulfonamide, of the formula CH$_3$C$_6$H$_4$SO$_2$NHCO$_2$C (CH$_3$)$_3$ (Aldrich 36,383-9), (j) N,N'-bis(α-methylbenzyl) sulfamide, of the formula (C$_6$H$_5$CH(CH$_3$)NH)$_2$SO$_2$ (Aldrich 27,607-3, 27,608-1), and the like, as well as mixtures thereof; (2) imides: (a) succinimides: (i) (S)-(−)-2-hydroxy-N-methyl succinimide (Aldrich 37,014-2), of the formula

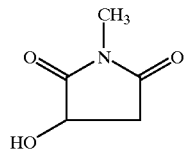

(ii) α,α-dimethyl-β-methyl succinimide (Aldrich 16,350-3), of the formula

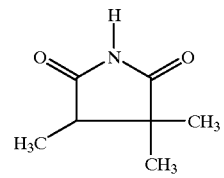

(iii) α-methyl-α-phenyl succinimide (Aldrich 86,058-1), of the formula

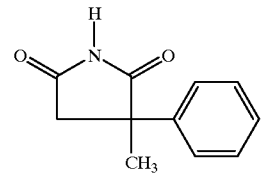

(iv) N-(2-chloro benzyloxy carbonyloxy) succinimide (Aldrich 28,949-3), (v) N-(benzyloxy carbonyloxy) succinimide (Aldrich 22,778-1), and the like, as well as mixtures thereof; (b) phthalimides: (i) N-ethylphthalimide (Aldrich 403,321-0), (ii) N-(2-hydroxyethyl) phthalimide (Aldrich 13,833-9), (iii) N-(2-bromoethyl) phthalimide (Aldrich B6,630-2), (iv) N-(2-chloroethyl) phthalimide (Aldrich 34,965-8), (v) N-(3-hydroxypropyl) phthalimide (Aldrich 10,306-3), (vi) N-(2-bromobutyl) phthalimide (Aldrich 10,091-9), of the formula

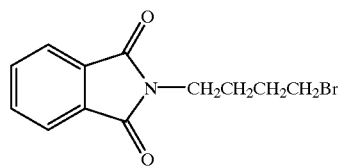

(vii) N-benzyl phthalimide (Aldrich 40,475-6), (viii) N-carbethoxy phthalimide (Aldrich C,545-9), (ix) N-(tert-butoxycarbonyloxy) phthalimide (Aldrich 14,924-1), (x) N-acetonylphthalimide (Aldrich 38,057-1), of the formula

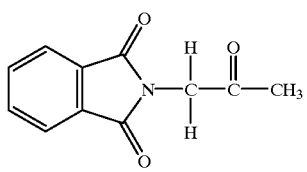

and the like, as well as mixtures thereof; (c) anilides: (i) acetanilide (Aldrich 39,723-7), (ii) aceto acetanilide, of the formula $CH_3COCH_2CONHC_6H_5$ (Aldrich A873-2), (iii) acetoacetanisidide, of the formula $CH_3COCH_2CONHC_6H_4OCH_3$ (Aldrich A875-9; 16,508-5), (iv) o-aceto acetotoluidide, of the formula $CH_3COCH_2CONHC_6H_4CH_3$ (Aldrich 12,268-8), (v) 2-benzoyl acetanilide (Aldrich A8,980-4), (vi) 4'-amino-N-methyl acetanilide (Aldrich 24,667-0), (vii) anthranilamide (Aldrich A8,980-4), (viii) 4'-ethyl-3'-methyl acetanilide (Aldrich 29,254-0), (ix) 2'-benzyl-2,2-dimethylpropionanilide (Aldrich 34,899-6), (x) S-benzyl-L-cysteine-4-nitroanilide (Aldrich 85,866-8), and the like, as well as mixtures thereof. N-(hydroxyphenyl) stearamide (Aldrich 38,548-4) is also a suitable viscosity modifier. The viscosity modifier generally acts to lower the viscosity of the ink at the jetting temperature, typically lowering the viscosity by from about 10 to about 20 centipoise compared to a similar composition containing no viscosity modifier, although the quantitative viscosity adjustment can be outside of this range. The viscosity modifier is present in the ink in any desired or effective amount, typically no less than about 1 percent by weight of the ink, preferably no less than about 7 percent by weight of the ink, and more preferably no less than about 10 percent by weight of the ink, and typically no more than about 98 percent by weight of the ink, preferably no more than about 59 percent by weight of the ink, more preferably no more than about 50 percent by weight of the ink, and even more preferably no more than about 40 percent by weight of the ink, although the amount can be outside of these ranges. Preferably, the viscosity modifier has a melting point of no lower than about 60° C., and preferbly has a melting point no higher than about 155° C., and preferably has an acoustic-loss value of no more than about 100 decibels per millimeter, although the melting point and acoustic-loss value can be outside of these ranges. In addition, conductive materials generally are preferred to nonconductive materials, although nonconductive materials can also be employed.

The ink compositions of the present invention further contain a conductive sulfonate salt. Examples of suitable conductive sulfonate salts include (i) 2-hydroxycyclohexyl-ρ-toluene sulfonate (Aldrich 25,504-1), (ii) 1-cyclohexyl-3-(2-morpholino ethyl) carbodiimide metho-ρ-toluene sulfonate (Aldrich C10,640-2), of the formula

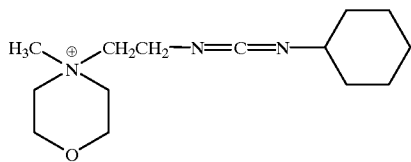

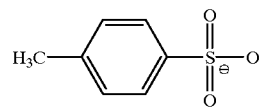

(iii) N,N-diisopropylethylamine-ρ-toluene sulfonate, a complex of the formula $((CH_3)_2CH)_2NC_2H_5 \cdot CH_3C_6H_4SO_3H$ (Aldrich 19,981-8), (iv) tetrabutyl ammonium trifluoromethane sulfonate, of the formula $(CF_3SO_3)N((CH_2)_3CH_3)_4$ (Aldrich 34,509-1), (v) 2-fluoro-1-methyl pyridinium-ρ-toluene sulfonate (Aldrich 24,955-6), of the formula

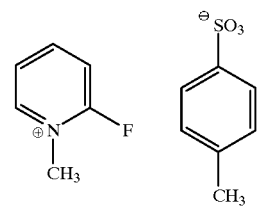

(vi) methyl-1-adamantane sulfonate (Aldrich 40,956-1), (vii) octadecyl 4-chlorobenzene sulfonate, of the formula $ClC_6H_4SO_3(CH_2)_{17}CH_3$ (Aldrich 47,799-0), (viii) tetrabutylammonium-ρ-toluene sulfonate, of the formula $(CH_3(CH_2)_3)_4N(CH_3C_6H_4SO_3)$ (Aldrich 35,868-1), (ix) 1,4-dihydro-1-(trifluoroacetyl) pyridin-4-ylidene) dimethyl ammonium trifluoroacetate (Aldrich 47,263-8), of the formula

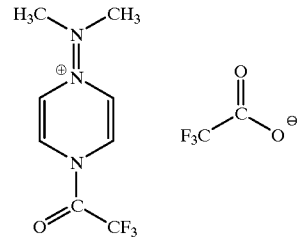

(x) S-(+)-(hydroxymethyl)-2-pyrrolidinone-ρ-toluene sulfonate (Aldrich 44,453-7), of the formula

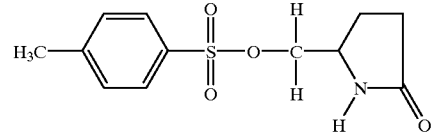

(xi) 2,4,6-collidine-ρ-toluene sulfonate (Aldrich 28,315-0), or (xii) mixtures thereof. The conductive sulfonate salt is present in the ink in any desired or effective amount, typically no less than about 0.5 percent by weight of the ink, preferably no less than about 10 percent by weight of the ink, and more preferably no less than about 20 percent by weight of the ink, and typically no more than about 98 percent by weight of the ink, preferably no more than about 49 percent by weight of the ink, more preferably no more than about 45 percent by weight of the ink, and even more preferably no more than about 40 percent by weight of the ink, although the amount can be outside of these ranges. The conductive sulfonate salt typically exhibits a melting point of no less than about 60° C., and preferably no less than about 75° C., and typically has a melting point of no more than about 155° C., and preferably no more than about 125° C., although the melting point can be outside of these ranges. In addition, the conductive sulfonate salt typically exhibits minimal or no water solubility.

Any desired or effective colorant can be employed in the inks of the present invention, including dyes, pigments, mixtures thereof, and the like, provided that the colorant can be dissolved or dispersed in the ink vehicle, with spirit soluble dyes being preferred. The colorant is present in the ink in any desired or effective amount to obtain the desired color and hue, typically no less than about 0.5 percent by weight of the ink, and preferably no less than about 3 percent by weight of the ink, and typically no more than about 20 percent by weight of the ink, and preferably no more than about 12 percent by weight of the ink, although the amount can be outside of these ranges.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-1 1 1-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871 K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2GO1 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 26050] (BASF) are preferred.

The optional antioxidants in the ink compositions protect the images from oxidation and also protect the ink components from oxidation during the heating portion of the ink preparation process. Specific examples of suitable antioxidants include (but are not limited to) (1) 2,6-di-tert-butyl-4-methoxyphenol (Aldrich 25,106-2), (2) 2,4-di-tert-butyl-6-(4-methoxybenzyl) phenol (Aldrich 23,008-1), (3) 4-bromo-2,6-dimethylphenol (Aldrich 34,951-8), (4) 4-bromo-3,5-didimethylphenol (Aldrich B6,420-2), (5) 4-bromo-2-nitrophenol (Aldrich 30,987-7), (6) 4-(diethyl aminomethyl)-2,5-dimethylphenol (Aldrich 14,668-4), (7) 3-dimethylaminophenol (Aldrich D14,400-2), (8) 2-amino-4-tert-amylphenol (Aldrich 41,258-9), (9) 2,6-bis (hydroxymethyl)-p-cresol (Aldrich 22,752-8), (10) 2,2'-methylenediphenol (Aldrich B4,680-8), (11) 5-diethylamino)-2-nitrosophenol (Aldrich 26,951-4), (12) antimony dialkyl phosphorodithioate (commercially available from Vanderbilt), (13) molybdenum oxysulfide dithiocarbamate (commercially available from Vanderbilt), (14) (nickel-bis(o-ethyl(3,5-di-tert-butyl-4-hydroxybenzyl) phosphonate (commercially available from Ciba Geigy), (15) 4,4'-methylene-bis(dibutyldithiocarbamate) (commercially available as Vanlube 7723 from Vanderbilt), (16) tetrasodium-N-(1,2-dicarboxyethyl)-N-octadecyl sulfosuccinamate (commercially available from American Cyanamid), (17) 2,6-di-tert-butyl-α-dimethylamino-4-cresol (commercially available as Ethanox-703 from Ethyl Corporation), (18) 2,2'-isobutylidene-bis(4,6-dimethyl phenol) (commercially available as Vulkanox NKF from Mobay Chemicals), (19) 2,2'-methylenebis(6-tert-butyl-4-methylphenol) (commercially available as Cyanox-2246, Aldrich 41,315-5), (20) 2,2'-methylenebis(6-tert-bufyl-4-ethylphenol) (commercially available as Cyanox-425, Aldrich 41,314-3), (21) N-isopropyl-N'-phenyl-phenylene diamine (commercially available as Santoflex-IP from Monsanto Chemicals, (22) N-(1,3-dimethylbutyl)-N'-phenyl-phenylene-diamine (commercially available as Santoflex-13 from Monsanto Chemicals), (23) N,N'-di(2-octyl)-4-phenylene diamine (commercially available as Antozite-1 from Vanderbilt), (24) N,N'-bis(1,4-dimethylpentyl)-4-phenylene diamine (commercially available as Santoflex-77 from Monsanto Chemicals), (25) 2,4,6-tris-(N-1,4-dimethyl pentyl-4-phenylenediamino)-1,3,5-trirzine (commercially available as Durazone-37 from Uniroyal), (26) D-raffinose pentahydrate (Aldrich 20,667-9), (27) 2,2'-methylene bis(6-tert-butyl-4-methyl-phenol) (Aldrich 41,313-5), (28) 2,6-di-tert-butyl-4-(dimethylaminomethyl) phenol (Aldrich 41,327-5), (29) 4-dodecylresorcinol (Aldrich D22,260-7), and the like, as well as mixtures thereof. When present, the optional antioxidants are present in any desired or effective amount, typically no less than about 0.25 percent by weight of the ink, and preferably no less than about 1 percent by weight of the ink, and typically no more than about 97 percent by weight of the ink, preferably no more than about 10 percent by weight of the ink, and more preferably no more than about 5 percent by weight of the ink, although the amount can be outside of these ranges.

The optional UV absorbers in the inks of the present invention primarily protect the images generated therewith from UV degradation. Specific examples of suitable UV absorbers include (but are not limited to) (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl) acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl) bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy) ethylacrylate, (14) 2-dodecyl-N-(1,2,2,6,6-pentamethyl-4-piperidinyl) succinimide (commercially available from Aldrich Chemical Co., Milwaukee, Wis.), (15) 2,2,6,6-tetramethyl-4-piperidinyl/β,β,β',β'-tetramethyl-3,9-(2,4,8,10-tetraoxo spiro(5,5)-undecane) diethyl]-1,2,3,4-butane tetracarboxylate (commercially available from Fairmount), (16) N-ρ-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetramethyl-4-piperidinyl) succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) [1,2,2,6,6-pentamethyl-4-piperidinyl/β,ββ',β'-tetramethyl-3,9-(2,4,8,10-tetraoxo-spiro-(5,5) undecane)diethyl]-1,2,3,4-butane tetracarboxylate (commercially available from Fairmount), (22) [2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis (diethylamino) benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), and the like, as well as mixtures thereof. The UV absorber is present in the ink in any desired or effective amount, typically no less than about 0.25 percent by weight of the ink, and preferably no less than about 1 percent by weight of the ink, and typically no more than about 10 percent by weight of the ink, and preferably no more than about 5 percent by weight of the ink, although the amount can be outside of these ranges.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or bases, phosphate salts, carboxylates salts, sulfite salts, amine salts, and the like, present in an amount of from 0 to about 1 percent by weight of the ink and preferably from about 0.01 to about 1 percent by weight of the ink, or the like.

The ink compositions of the present invention typically have melting points no lower than about 60° C., preferably no lower than about 70° C., and more preferably no lower than about 80° C., and typically have melting points no higher than about 140° C., preferably no higher than about 120° C., and more preferably no higher than about 100° C., although the melting point can be outside of these ranges.

The ink compositions of the present invention generally have melt viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 25 centipoise, preferably no more than about 20 centipoise, and even more preferably no more than about 10 centipoise, and typically of no less than about 2 centipoise, preferably no less than about 5 centipoise, and even more preferably no less than about 7 centipoise, although the melt viscosity can be outside of these ranges. Since image hardness tend to drop with lower viscosities, it is preferred that the viscosity be as low as possible while still retaining the desired degree of image hardness.

Hardness is a property of solids and plastics that is defined by their solidity and firmness as measured by their resistance to indentation by an indenter of fixed shape and size under a static load. The hardness of images can be measured with a Digital-Pencil style Durometer, Model 211 B-00 PTC, obtained from Pacific Transducer Corporation, using ASTM Standard specifications for resistance to penetration with a conical [30 degrees included angle] indenter and applying a 1 kilogram load. The hardness range for materials as measured with this instrument is from about 1 to about 100, the latter being the highest measurable value. It is believed that the images generated with the inks of the present invention, after cooling to ambient temperature (typically from about 20 to about 25° C., although ambient temperature can be outside of this range) will exhibit hardness values of at least about 70 or more.

The inks of the present invention typically undergo, upon heating, a change from a solid state to a liquid state in a period of less than about 100 milliseconds, preferably less than about 50 milliseconds, and more preferably less than about 10 milliseconds, although the time can be outside of these ranges. There is no necessary lower limit on this period of time for the inks; it is believed that practically achievable lower limits are around 5 milliseconds, although, if practically achievable, lower periods of time are acceptable.

The inks of the present invention typically exhibit acoustic-loss values of no more than about 100 decibels per millimeter, preferably no more than about 60 decibels per millimeter, and more preferably no more than about 40 decibels per millimeter, although the acoustic-loss value can be outside of these ranges. There is no necessary lower limit on acoustic-loss value for the inks; it is believed that practically achievable lower limits are around 10 decibels per millimeter, although, if practically achievable, lower acoustic-loss values are acceptable. Acoustic-loss can be measured by placing a sample of the material to be measured between two transducers with the temperature set at about 150° C. The samples are allowed to equilibrate at 150° C. for five minutes. The two transducers are then brought together to maximize the acoustic signal. The amplitude and the position of the signals are recorded. The two transducers are then separated by a distance varying from about 25.4 microns to about 125.4 microns, recording each time the amplitude and the position of the signal. Preferably, each measurement is performed three times, and three samples of the same material are measured. The attenuation decibels per millimeter is then calculated by ratioing the amplitude values obtained at different separation distances.

The inks of the present invention typically exhibit a conductivity of no less than about 2 log(picomho/cm), preferably no less than about 6 log(picomho/cm), more preferably no less than about 6.5 log(picomho/cm), and even more preferably no less than about 7 log(picomho/cm), although the conductivity can be outside of these ranges. While there is no upper limit on conductivity, typical conductivity values generally do not exceed about 9 log (picomho/cm). Conductivity can be measured under melt conditions (typically at about 150° C.) by placing an aluminum electrode in the molten ink and reading the resistivity output on a GenRad 1689 precision RLC Digibridge at a frequency of 1 kilohertz). The conductivity of the material is measured in terms of the reciprocal of resistivity, which is the capacity for electrical resistance.

The inks of the present invention exhibit substantial transparency. The images generated with the inks typically exhibit haze values of no more than about 25, preferably no more than about 10, and preferably no more than about 5, although the haze value can be outside of these ranges. There is no required lower limit on haze values. Haze values can be measured on images printed with the ink on uncoated polyester, such as MYLAR®, with a Haze meter XL-21 1, HAZEGARD® System obtained from Pacific Scientific Company.

The inks of the present invention generate images with desirable crease resistance. The images generated with the inks typically exhibit crease values of no more than about 0.6 millimeters, preferably no more than about 0.2 millimeters, and more preferably no more than about 0.1 millimeters, although the crease value can be outside of these ranges. There is no lower limit on crease values; ideally, this value is zero. The average width of the creased image can be measured by printing an image on paper, followed by (a) folding inwards the printed area of the image, (b) passing over the folded image a standard TEFLON® coated copper roll 2 inches in width, 3 inches in outer diameter, 2.25 inches in inner diameter, and weighing 860 grams, (c) unfolding the paper and wiping the loose ink from the creased imaged surface with a cotton swab, and (d) measuring the average width of the ink free creased area with an image analyzer. The crease value can also be reported in terms of area, especially when the image is sufficiently hard to break unevenly on creasing. Measured in terms of area, crease values of 60 millimeters correspond to about 0.6, crease values of 40 millimeters correspond to about 0.4, crease values of 10 millimeters correspond to about 0.1, and the like.

The ink compositions of the present invention can be prepared by any desired or suitable method. For example, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). The inks of the present invention are solid at ambient temperature.

The present invention is also directed to a process which entails incorporating an ink of the present invention into an ink jet printing apparatus, melting the ink, and causing droplets of the melted ink to be ejected in an imagewise pattern onto a recording sheet. In one preferred embodiment, the printing apparatus employs an acoustic ink jet process, wherein droplets of the ink are caused to be ejected in imagewise pattern by acoustic beams. In a particularly preferred embodiment, the printing apparatus employs an acoustic ink jet printing process wherein droplets of the ink are formed by acoustic beams without imparting a substantial velocity component toward the print medium, using a droplet forming force that is sufficient only to form the ink droplets, and the printing process further comprises generating an electric field to exert an electrical force different from the droplet forming force on the ink droplets to move the ink droplets toward the print medium, and controlling the electrical force exerted on the formed complete ink droplets by the electric field.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

The inks of the present invention are particularly suitable for printing processes wherein the printing substrate, such as paper, transparency material, or the like, is heated during the printing process. When transparency substrates are employed, temperatures typically are no higher than from about 100 to about 110° C., since the polyester commonly employed as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40 to about 140° C., and preferably from about 60 to about 95° C., although the temperature can be outside of these ranges.

Specific embodiments of the invention will now be described in detail. These examples are intended to be illustrative, and the invention is not limited to the materials, conditions, or process parameters set forth in these embodiments. All parts and percentages are by weight unless otherwise indicated.

Acoustic-loss measurements in the Examples were measured by placing samples of the materials between the two transducers with the temperature set at 150° C. The samples were allowed to equilibrate at 150° C. for five minutes. The two transducers were then brought together to maximize the acoustic signal. The amplitude and the position of the signals were recorded. The two transducers were then separated by a distance varying from 25.4 microns to 125.4 microns, recording each time the amplitude and the position of the signal. Each measurement was performed three times, and three samples of each material were measured. The attenuation decibels per millimeter was then calculated by ratioing the amplitude values obtained at different separation distances.

Optical density values in the Examples were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numeric keyboard for selection of operating parameters and the entry of tristimulus values, and an alphanumeric keyboard for entry of product standard information.

Lightfast values in the Examples were measured in a Mark V Lightfast Tester, obtained from Microscal Company, London, England.

Waterfast values in the Examples were obtained from the optical density data recorded before and after washing the images with water at 25° C. for five minutes.

Viscosity values in the Examples were measured at 150° C. with a Stress Rheometer, obtained from Cari-Med, Model CSL 100. All experiments were performed at a shear rate of $1250 \text{ s}^{-1}$.

Conductivity values in the Examples were measured under melt conditions at 150° C. by placing an aluminum electrode in the melt and reading the resistivity output on a GenRad 1689 precision RLC Digibridge at a frequency of 1 kilohertz. Conductivity was calculated from the resistivity data.

Crease values in the Examples were measured on solid area images printed on paper by (a) folding inwards the printed area of the image, (b) passing over the folded image a standard TEFLON® coated copper roll 2 inches in width, 3 inches in outer diameter, 2.25 inches in inner diameter, and weighing 860 grams, (c) unfolding the paper and wiping the loose ink from the creased imaged surface with a cotton swab, and (d) measuring the average width of the ink free creased area with an image analyzer.

Haze values in the Examples were measured on images printed on uncoated polyester (such as MYLAR®) with a Haze meter XL-211, HAZEGARD® System, obtained from Pacific Scientific Company.

The spherulite sizes in the Examples were measured with an optical microscope with cross polarized light.

EXAMPLE I

A black phase-change ink was prepared by mixing 30 percent by weight N,N-diisopropyl ethylamine-ρ-toluene sulfonate (conductive sulfonate salt; Aldrich 19,981-8; conductivity 9.3 log(picomho/cm); acoustic-loss value 30 decibels per millimeter; melting point 87° C.), 35 percent by weight N,N-dimethyl dodecyl amine N-oxide (ink vehicle; Aldrich 28,970-1; melting point ~132° C.), 20 percent by weight 3-amino-N-butylbenzene sulfonamide (viscosity modifier; Aldrich 38,747-9; acoustic-loss value 20 decibels per millimeter; melting point 77° C.), 5 percent by weight 2-(2H-benzotriazol-2-yl)-4,6-di-tert-pentylphenol (UV absorber; Aldrich 42,274-6), 5 percent by weight 2,6-di-tert-butyl-4-methoxyphenol (antioxidant; Aldrich 25,106-2), and 5 percent by weight Neozapon Black X51 dye (C.I. Solvent Black; C.I. 12195; obtained from BASF). The mixture was heated to a temperature of about 140° C., stirred for a period of about 60 minutes until it formed a homogeneous solution, and subsequently cooled to 25° C. This black ink exhibited an acoustic-loss value of 59 decibels per millimeter, a viscosity of 8.65 centipoise at 150° C., and a conductivity of 8.5 log(picomho/cm) at 150° C.

EXAMPLE II

A blue phase-change ink was prepared by mixing 30 percent by weight 2-fluoro-1-methylpyridinium-ρ-toluene sulfonate (conductive sulfonate salt; Aldrich 24,955-6; melting point 132° C.; acoustic-loss value 38 decibels per millimeter; conductivity 8.5 log(picomho/cm)), 35 percent by weight N,N-dimethyl dodecyl amine-N-oxide (ink vehicle; Aldrich 28,970-1; melting point 132° C.), 20 percent by weight N-(tert-butoxycarbonyl)-ρ-toluene sulfonamide (viscosity modifier; Aldrich 36,383-9; melting point 122° C.; acoustic-loss value 35 decibels per millimeter), 5 percent by weight 2-(2H-benzotriazol-2-yl)-4,6-di-tert-pentylphenol (UV absorber; Aldrich 42,274-6), 5 percent by weight 2,6-di-tert-butyl-4-methoxyphenol (antioxidant; Aldrich 25,106-2), and 5 percent by weight Sudan Blue 670 dye (C.I. 61554; obtained from BASF). The mixture was heated to a temperature of about 140° C., stirred for a period of about 60 minutes until it formed a homogeneous solution, and subsequently cooled to 25° C. This blue ink exhibited an acoustic-loss value of 57 decibels per millimeter, a viscosity of 7.72 centipoise at 150° C., and a conductivity of 8.0 log(picomho/cm) at 150° C.

EXAMPLE III

A yellow phase-change ink was prepared by mixing 30 percent by weight tetrabutylammonium-ρ-toluene sulfonate (conductive sulfonate salt; Aldrich 35,868-1; melting point 72° C.; acoustic-loss value 33 decibels per millimeter; conductivity 8.0 log(picomho/cm)), 35 percent by weight N,N-dimethyl dodecyl amine N-oxide (ink vehicle; Aldrich 28,970-1; melting point ~132° C.), 20 percent by weight N-(hydroxyphenyl) stearamide (viscosity modifier; Aldrich 38,548-4; melting point 132° C.; acoustic-loss value 37 decibels per millimeter), 5 percent by weight 2-(2H-benzotriazol-2-yl)-4,6-di-tert-pentylphenol (UV absorber; Aldrich 42,274-6), 5 percent by weight 2,6-di-tert-butyl-4-methoxyphenol (antioxidant; Aldrich 25,106-2), and 5 percent by weight Sudan Yellow 146 dye (C.I. 12700; obtained from BASF). The mixture was heated to a temperature of about 140° C., stirred for a period of about 60 minutes until it formed a homogeneous solution, and subsequently cooled to 25° C. This yellow ink exhibited an acoustic-loss value of 56 decibels per millimeter, a viscosity of 8.5 centipoise at 150° C., and a conductivity of 7.8 log(picomho/cm) at 150° C.

EXAMPLE IV

A red phase-change ink was prepared by mixing 70 percent by weight (S)-(+)-5-(hydroxymethyl)-2-pyrrolidone-ρ-toluene sulfonate (conductive sulfonate salt; Aldrich 44,454-7; melting point 128° C.; acoustic-loss value 34 decibels per millimeter; conductivity 8.7 log(picomho/ cm)), 35 percent by weight N,N-dimethyl dodecyl amine N-oxide (ink vehicle; Aldrich 28,970-1; melting point ~132° C.), 20 percent by weight α,α-dimethyl-β-methylsuccinimide (viscosity modifier; Aldrich 16,350-3; melting point 120° C.), 5 percent by weight 2-(2H-benzotriazol-2-yl)-4,6-di-tert-pentylphenol (UV absorber; Aldrich 42,274-6), 5 percent by weight 2,6-di-tert-butyl-4-methoxyphenol (antioxidant; Aldrich 25,106-2), and 5 percent by weight Sudan Red 462 dye (C.I. 26050; obtained from BASF). The mixture was heated to a temperature of about 140° C., stirred for a period of about 60 minutes until it formed a homogeneous solution, and subsequently cooled to 25° C. This red ink exhibited an acoustic-loss value of 58 decibels per millimeter, a viscosity of 8.8 centipoise, and a conductivity of 8.5 log(picomho/cm) at 150° C.

EXAMPLE V

Each of the inks prepared as described in Examples I through IV was incorporated into an acoustic ink jet printing test fixture utilizing the ejection mechanism disclosed in *J. Appl. Phys.*, 65(9), May 1, 1989, and references therein, the disclosures of each of which are totally incorporated herein by reference. A jetting frequency of 160 MHz was used to generate drops of about 2 picoliters, up to 12 drops per pixel at 600 spi. The images formed on paper exhibited excellent color quality, optical density values of 2.30 (black), 1.90 (cyan), 2.0 (magenta), and 1.5 (yellow), sharp edges, light-fast values of 97.5% (black), 98.5% (cyan), 97% (magenta), and 99% (yellow), and waterfast values of 96.5% (black), 97.% (cyan), 98% (magenta), and 100% (yellow). The images obtained with these conductive inks on paper were folded and creased. The crease values (measured in terms of area and subsequently converted to millimeters) were 0.04 (black), 0.09 (cyan), 0.07 (magenta), and 0.06 (yellow). The ink spherulite radius was measured at 1 to 2.5 microns, leading to haze values of 10 to 12 when printed on transparency substrates.

EXAMPLE VI

A black phase-change ink was prepared by mixing 30 percent by weight 2,4,6-collidine-ρ-toluene sulfonate (conductive sulfonate salt; Aldrich 28,315-0; acoustic-loss value 20 decibels per millimeter; melting point 72° C.; conductivity 8.6 log(picomho/cm)), 35 percent by weight N,N-dimethyl undecyl amine N-oxide (ink vehicle; Aldrich 38,253-1; melting point 130° C.), 20 percent by weight o-aceto acetotoluidide (viscosity modifier; Aldrich 12,268-8; acoustic-loss value 35 decibels per millimeter; melting point 105° C.), 5 percent by weight 2-(2H-benzotriazol-2-yl)-4,6-di-tert-pentyl phenol (UV absorber; Aldrich 42,274-6), 5 percent by weight 2,4-di-tert-butyl-6-(4-methoxybenzyl)phenol (antioxidant; Aldrich 25,106-2), and 5 percent by weight Neozapon Black X51 dye (C.I. Solvent Black; C.I. 12195; obtained from BASF). The mixture was heated to a temperature of about 120° C., stirred for a period of about 60 minutes until it formed a homogeneous solution, and subsequently cooled to 25° C. This black ink exhibited an acoustic-loss value of 59 decibels per millimeter, a viscosity of 8.45 centipoise at 150° C., and a conductivity of 8.0 log(picomho/cm) at 150° C.

EXAMPLE VII

A blue phase-change ink was prepared by mixing 30 percent by weight 2-fluoro-1-methylpyridinium-ρ-toluene sulfonate (conductive sulfonate salt; Aldrich 24,955-6; melting point 132° C.; acoustic-loss value 38 decibels per millimeter; conductivity 8.5 log(picomho/cm)), 35 percent by weight N,N-dimethyl undecyl amine N-oxide (ink vehicle; Aldrich 38,253-1; melting point 130° C.), 20 percent by weight N-(tert-butoxycarbonyl)-ρ-toluene sulfonamide (viscosity modifier; Aldrich 36,383-9; melting point 122° C.; acoustic-loss value 35 decibels per millimeter), 5 percent by weight 2-(2H-benzotriazol-2-yl)-4,6-di-tert-pentylphenol (UV absorber; Aldrich 42,274-6), 5 percent by weight 2,6-di-tert-butyl-4-methoxyphenol (antioxidant; Aldrich 25,106-2), and 5 percent by weight Sudan Blue 670 dye (C.I. 61554; obtained from BASF). The mixture was heated to a temperature of about 140° C., stirred for a period of about 60 minutes until it formed a homogeneous solution, and subsequently cooled to 25° C. This blue ink exhibited an acoustic-loss value of 54 decibels per millimeter, a viscosity of 7.72 centipoise at 150° C., and a conductivity of 8.0 log(picomho/cm) at 150° C.

EXAMPLE VIII

A yellow phase-change ink was prepared by mixing 30 percent by weight tetrabutylammonium-ρ-toluene sulfonate (conductive sulfonate salt; Aldrich 35,868-1; melting point 72° C.; acoustic-loss value 33 decibels per millimeter; conductivity 8.0 log(picomho/cm)), 35 percent by weight N,N-dimethyl undecyl amine N-oxide (ink vehicle; Aldrich 38,253-1); melting point 130° C.), 20 percent by weight N-(hydroxyphenyl) stearamide (viscosity modifier; Aldrich 38,548-4); melting point 132° C.; acoustic-loss value 37 decibels per millimeter), 5 percent by weight 2-(2H-benzotriazol-2-yl)-4,6-di-tert-pentylphenol (UV absorber; Aldrich 42,274-6), 5 percent by weight 2,6-di-tert-butyl-4-methoxyphenol (antioxidant; Aldrich 25,106-2), and 5 percent by weight Sudan Yellow 146 dye (C.I. 12700; obtained from BASF). The mixture was heated to a temperature of about 140° C., stirred for a period of about 60 minutes until it formed a homogeneous solution, and subsequently cooled to 25° C. This yellow ink exhibited an acoustic-loss value of 58 decibels per millimeter, a viscosity of 8.5 centipoise at 150° C., and a conductivity of 7.8 log(picomho/cm) at 150° C.

EXAMPLE IX

A red phase-change ink was prepared by mixing 70 percent by weight (S)-(+)-5-(hydroxymethyl)-2-pyrrolidone-ρ-toluene sulfonate (conductive sulfonate salt; Aldrich 44,454-7; melting point 128° C.; acoustic-loss value 34 decibels per millimeter; conductivity 8.7 log(picomho/cm)), 35 percent by weight N,N-dimethyl undecyl amine N-oxide (ink vehicle; Aldrich 38,253-1; melting point 130° C.), 20 percent by weight α,α-dimethyl-β-methylsuccinimide (viscosity modifier; Aldrich 16,350-3; melting point 120° C.), 5 percent by weight 2-(2H-benzotriazol-2-yl)-4,6-di-tert-pentylphenol (UV absorber; Aldrich 42,274-6); 5 percent by weight 2,6-di-tert-butyl-4-methoxyphenol (antioxidant; Aldrich 25,106-2), and 5 percent by weight Sudan Red 462 dye (C.I. 26050; obtained from BASF). The mixture was heated to a temperature of about 140° C., stirred for a period of about 60 minutes until it formed a homogeneous solution, and subsequently cooled to 25° C. This red ink exhibited an acoustic-loss value of 58 decibels per millimeter, a viscosity of 8.8 centipoise at 150° C., and a conductivity of 8.5 log(picomho/cm) at 150° C.

EXAMPLE X

Each of the inks prepared as described in Examples VI through IX was incorporated into an acoustic ink jet printing test fixture and tested as described in Example V. The images formed on paper exhibited excellent color quality, optical density values of 2.45 (black), 1.90 (cyan), 2.1 (magenta), and 1.45 (yellow), sharp edges, lightfast values of 97.5% (black), 99.5% (cyan), 98% (magenta), and 99% (yellow), and waterfast values of 99% (black), 98.5.% (cyan), 99% (magenta), and 100% (yellow). The images obtained with these conductive inks on paper were folded and creased. The crease values (measured in terms of area and subsequently converted to millimeters) were 0.03 (black), 0.07 (cyan), 0.06 (magenta), and 0.04 (yellow). The images formed on uncoated Mylar® exhibited excellent color quality, optical density values of 1.51 (black), 1.59 (cyan), 1.43 (magenta), and 0.91 (yellow), and sharp edges. The haze values were 9 (black), 10 (cyan), 10 (magenta), and 12 (yellow). The gloss values of the images were measured at about 90 for all of these inks. The ink spherulite radius was measured at 1 to 2.5 microns, leading to haze values of 10 to 15 when printed on transparency substrates.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition comprising (a) an ink vehicle which is selected from (i) 1,3-dialkyl ureas, (ii) N,N'-ethylene bisalkylamides, (iii) N-[4-chloro-3-[4,5-dihydro-5-oxo-1-(2,4,6-trichlorophenyl)-1H-pyrazol-3-ylamino]phenyl]-2-(1-octadecenyl) succinimide, (iv) 1,3-diamino-5,6-bis(octyloxy) isoindoline, (v) N,N-dimethyl alkylamine N-oxides, (vi) alkyl amides, or (vii) mixtures thereof, said ink vehicle having a melting point of no lower than about 60° C. and no higher than about 155° C., (b) a viscosity modifier which is an amide having a melting point of no lower than about 60° C. and no higher than about 155° C., (c) a conductive sulfonate salt having a melting point of no lower than about 60° C. and no higher than about 155° C., (d) a colorant, (e) an optional antioxidant, and (f) an optional ultraviolet absorber.

2. An ink composition according to claim 1 wherein the ink has a melting point of no lower than about 60° C. and no higher than about 140° C.

3. An ink composition according to claim 1 wherein the ink has a melt viscosity at jetting temperature of no higher than about 25 centipoise.

4. An ink composition according to claim 1 wherein the ink undergoes, upon heating, a change from a solid state to a liquid state in a period of no more than about 100 milliseconds.

5. An ink composition according to claim 1 wherein the ink exhibits an acoustic-loss value of no more than about 100 decibels per millimeter.

6. An ink composition according to claim 1 wherein the ink exhibits a conductivity of no less than about 6 log (picomho/cm).

7. An ink composition according to claim 1 wherein images generated with the ink exhibit a haze value of no more than about 25.

8. An ink composition according to claim 1 wherein the ink vehicle is 1,3-dioctadecyl urea, N,N'-ethylene bisoleamide, N,N'-ethylene bisstearamide, N,N-dimethyl heptylamine N-oxide hydrate, N,N-dimethyl octylamine N-oxide hydrate, N,N-dimethyl nonylamine N-oxide hemihydrate, N,N-dimethyl undecyl amine N-oxide, N,N-dimethyl dodecyl amine N-oxide, erucamide, acetamide, propionamide, hexanoamide, octadecanamide, or mixtures thereof.

9. An ink composition according to claim 1 wherein the viscosity modifier is a sulfonamide, an imide, an anilide, or a mixture thereof.

10. An ink composition according to claim 1 wherein the viscosity modifier is methane sulfonamide, 3-amino-N-butylbenzene sulfonamide, N-benzylidene benzene sulfonamide, N-methyl-ρ-toluene sulfonamide, N,N-bis[2-(p-tolylsulfonyloxy)ethyl]-ρ-toluene sulfonamide, N-benzyl-N-nitroso-ρ-toluene sulfonamide, N,N-bis(2-hydroxyethyl)-ρ-toluene sulfonamide, N-[bis(methylthio)methylene]-ρ-toluene sulfonamide, N-(tert-butoxycarbonyl)-ρ-toluene sulfonamide, N,N'-bis(α-methylbenzyl)sulfamide, 2-hydroxy-N-methyl succinimide, α,α-dimethyl-β-methyl succinimide, α-methyl-α-phenyl succinimide, N-(2-chloro benzyloxy carbonyloxy) succinimide, N-(benzyloxy carbonyloxy) succinimide, N-ethylphthalimide, N-(2-hydroxyethyl) phthalimide, N-(2-bromoethyl) phthalimide, N-(2-chloroethyl) phthalimide, N-(3-hydroxypropyl) phthalimide, N-(2-bromobutyl) phthalimide, N-benzyl phthalimide, N-carbethoxy phthalimide, N-(tert-butoxycarbonyloxy) phthalimide, N-acetonylphthalimide, acetanilide, aceto acetanilide, acetoacetanisidide, o-aceto acetotoluidide, 2-benzoyl acetanilide, 4'-amino-N-methyl acetanilide, anthranilamide, 4'-ethyl-3'-methyl acetanilide, 2'-benzyl-2,2-dimethylpropionanilide, benzyl cysteine-4-nitroanilide, N-(hydroxyphenyl) stearamide, or mixtures thereof.

11. An ink composition according to claim 1 wherein the conductive sulfonate salt is 2-hydroxycyclohexyl-ρ-toluene sulfonate, 1-cyclohexyl-3-(2-morpholino ethyl) carbodiimide metho-ρ-toluene sulfonate, N,N-diisopropylethylamine-ρ-toluene sulfonate, tetrabutyl ammonium trifluoromethane sulfonate, 2-fluoro-1-methyl pyridinium-ρ-toluene sulfonate, methyl-1-adamantane sulfonate, octadecyl 4-chlorobenzene sulfonate, tetrabutylammonium-ρ-toluene sulfonate, 1,4-dihydro-1-(trifluoroacetyl) pyridin-4-ylidene) dimethyl ammonium trifluoroacetate, hydroxymethyl-2-pyrrolidinone-ρ-toluene sulfonate, 2,4,6-collidine-ρ-toluene sulfonate, or mixtures thereof.

12. An ink composition according to claim 1 wherein the ink vehicle is present in the ink in an amount of no less than about 0.5 percent by weight of the ink and no more than about 49 percent by weight of the ink.

13. An ink composition according to claim 1 wherein the viscosity modifier is present in the ink in an amount of no less than about 1 percent by weight of the ink and no more than about 59 percent by weight of the ink.

14. An ink composition according to claim 1 wherein the conductive sulfonate salt is present in the ink in an amount of no less than about 0.5 percent by weight of the ink and no more than about 49 percent by weight of the ink.

15. An ink composition according to claim 1 wherein the colorant is a dye.

16. An ink composition according to claim 1 containing an antioxidant in an amount of no less than about 0.25 percent by weight of the ink and no more than about 10 percent by weight of the ink.

17. An ink composition according to claim 1 containing a UV absorber in an amount of no less than about 0.25 percent by weight of the ink and no more than about 10 percent by weight of the ink.

18. A printing process which comprises incorporating an ink according to claim 1 into an ink jet printing apparatus, melting the ink, and causing droplets of the melted ink to be ejected in an imagewise pattern onto a recording sheet.

19. A process according to claim 18 wherein the printing apparatus employs an acoustic ink jet process, wherein droplets of the ink are caused to be ejected in imagewise pattern by acoustic beams.

20. A process according to claim 18 wherein the printing apparatus employs an acoustic ink jet printing process wherein droplets of the ink are formed by acoustic beams without imparting a substantial velocity component toward the print medium, using a droplet forming force that is sufficient only to form the ink droplets, and wherein the printing process further comprises generating an electric field to exert an electrical force different from the droplet forming force on the ink droplets to move the ink droplets toward the print medium, and controlling the electrical force exerted on the formed complete ink droplets by the electric field.

* * * * *